Oct. 25, 1960 W. STELZER 2,957,454
BOOSTER BRAKE MECHANISM
Filed Oct. 13, 1958 3 Sheets-Sheet 1

INVENTOR.
WILLIAM STELZER
BY
John V. Phillips
ATTORNEY

Oct. 25, 1960  W. STELZER  2,957,454
BOOSTER BRAKE MECHANISM
Filed Oct. 13, 1958  3 Sheets-Sheet 2

INVENTOR.
WILLIAM STELZER
BY John F. Phillips
ATTORNEY

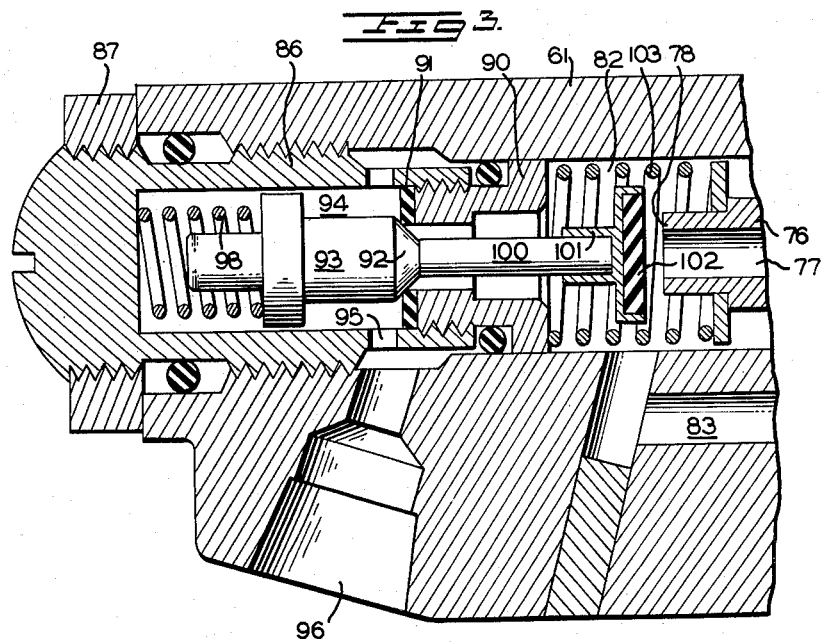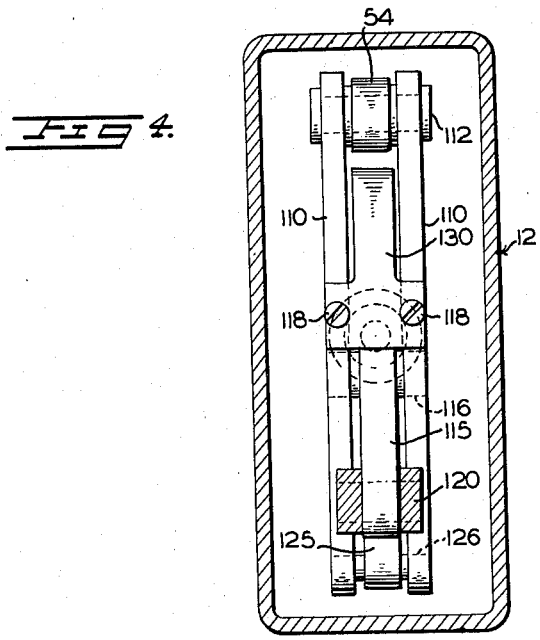

United States Patent Office 2,957,454
Patented Oct. 25, 1960

2,957,454

BOOSTER BRAKE MECHANISM

William Stelzer, Bloomfield Hills, Mich., assignor to Kelsey-Hayes Company, Detroit, Mich., a corporation of Delaware Filed Oct. 13, 1958, Ser. No. 766,790

16 Claims. (Cl. 121—41)

This invention relates to a booster brake mechanism.

An important object of the invention is to provide two separate hydraulic systems to operate the brakes of an automotive vehicle, so that in case of failure of one system the other is still operative.

A further object is to provide such a system wherein a single booster motor is employed for displacing hydraulic fluid through both systems to apply the brakes, and to provide novel means for transmitting force from the booster motor to the pressure generating plungers of the two systems.

A further object is to provide an apparatus of this character having a novel means for transmitting reaction forces to the brake pedal during later stages of brake actuation, that is, after the approximate point at which the brake shoes initially contact the drums.

A further object is to utilize in such system a novel lever mechanism for operating the valve mechanism for activating the booster motor and to transmit motor forces to the respective plungers of the two master cylinders employed in the apparatus, and to provide in conjunction with such lever mechanism novel means for transmitting reaction forces to the brake pedal.

A further object is to provide in such mechanism novel means for transmitting substantially direct pedal forces to one of the master cylinder plungers in the event of a failure of power for the booster motor.

Other objects and advantages of the invention will become apparent during the course of the following description.

In the drawings I have shown one embodiment of the invention. In this showing:

Figure 3 is an enlarged fragmentary sectional view showing the control valve mechanism for the motor; and, Figure 4 is a section on line 4—4 of Figure 2.

Figure 1:
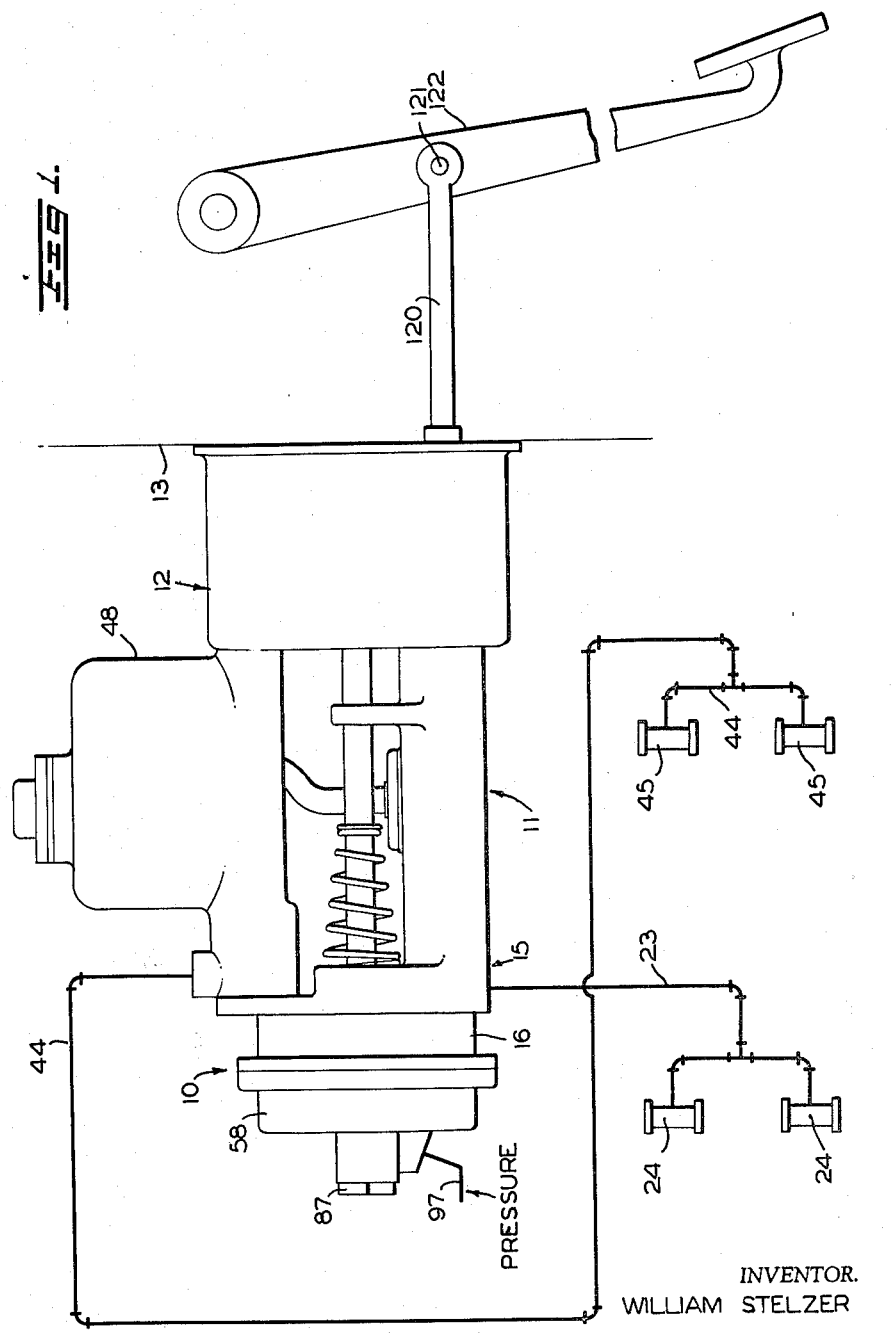
Figure 1 is a side elevation of the booster mechanism and its connection with the vehicle brake pedal, the wheel cylinders and the fluid lines thereto being diagrammatically shown.

Referring to Figure 1, the mechanism is shown as comprising a booster motor unit 10, a master cylinder unit 11, and a supporting bracket structure 12 for securing the unit to the vehicle fire wall.

Figure 2:
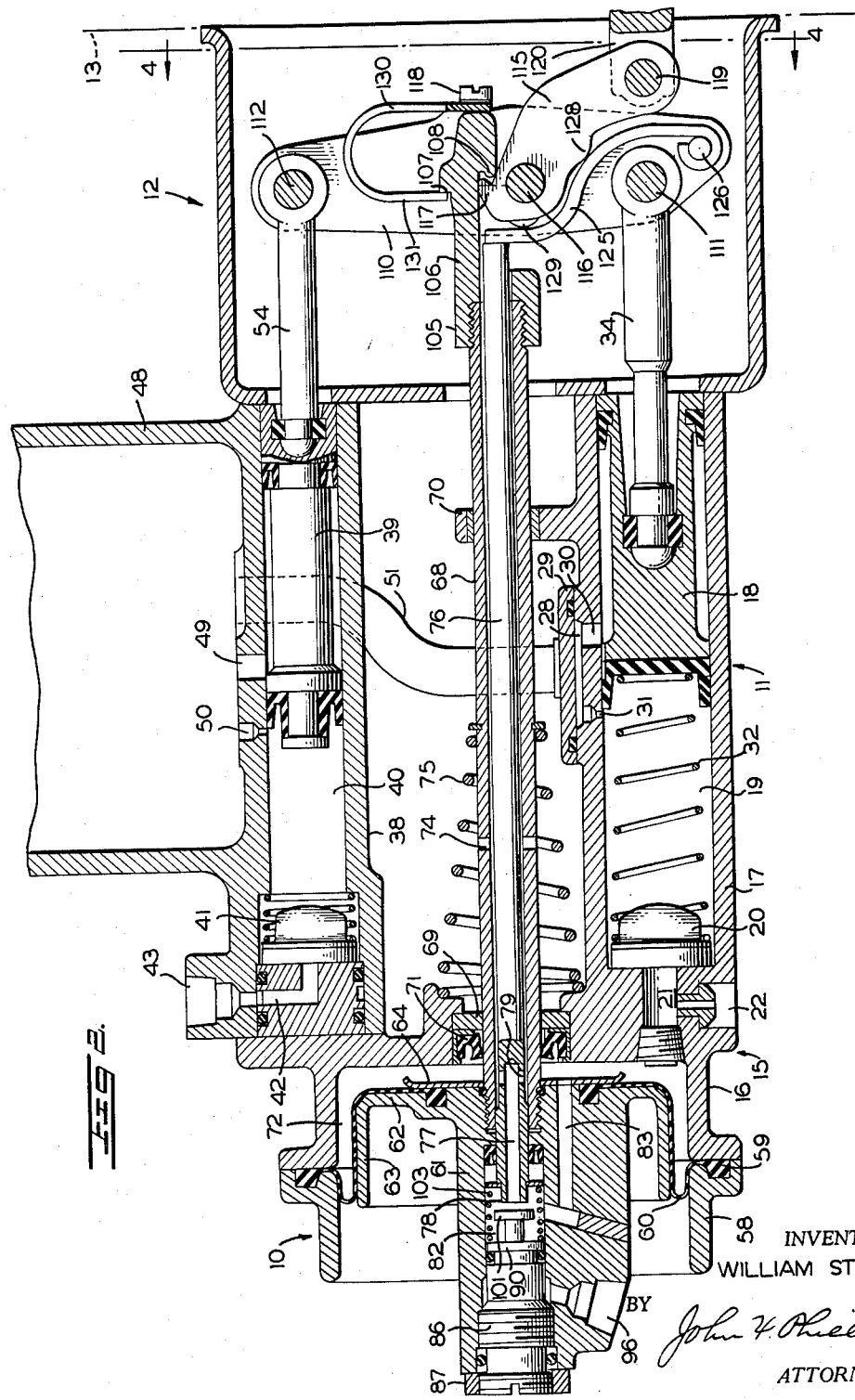
Figure 2 is an enlarged sectional view through the booster mechanism, parts being broken away.

Referring to Figure 2, the numeral 15 designates a body casting as a whole having a forwardly extending cylindrical portion 16 forming a part of the motor 10 as further described below. The casting 15 is provided with a preferably integral rearwardly extending master cylinder 17 having a plunger 18 slidable therein to generate pressure in a pressure chamber 19 from which hydraulic fluid flows past a conventional residual pressure valve 20 into a passage 21 having an outlet 22 connected by lines 23 (Figure 1) to a pair of the vehicle wheel cylinders 24, preferably the wheel cylinders for the front wheels.

The master cylinder 17 is provided at the top thereof with a chamber 28 covered by a sealed plate 29 to which brake fluid is supplied in a maner to be described and from which fluid is supplied to the interior of the master cylinder 17 through the usual ports 30 and 31. The latter port is a replenishing port arranged just forwardly of the adjacent end of the plunger 18 when the latter is in normal position, and the plunger is biased to such position by a spring 32. Forward movement of the plunger 18 is effected by transmitting forces, in the manner to be described, to a push rod 34.

Above the master cylinder 17, as viewed in Figure 2, is a second master cylinder 38 in which is operative a pressure generating plunger 39 for generating pressures in a chamber 40. Fluid flows from the chamber 40 past a conventional residual pressure valve 41 through a passage 42, thence through outlet 43 to lines 44 leading to the rear wheel cylinders 45 (Figure 1).

Above, and preferably formed integral with, the master cylinder 38 is a fluid reservoir 48 communicating with the interior of the master cylinder 38 through the usual openings 49 and 50, the later of which is a conventional replenishing port. A pipe 51 is connected at its upper end to the reservoir 48 to be supplied with fluid therefrom, and such pipe is connected at its lower end to the plate 29 to supply brake fluid to the chamber 28. Movement is imparted to the plunger 39 through a push rod 54.

The motor 10 comprises the flange 16 of the casting 15 as previously stated, and comprises a complementary cylindrical casing section 58 clamping in position against the flange 16 a bead 59 formed on the outer periphery of a rolling diaphragm 60. This diaphragm forms part of the pressure responsive unit of the motor, such unit further comprising a body 61 having its right-hand end portion as viewed in Figure 2 extending radially outwardly as at 62 and terminating in a cylindrical flange 63. The diaphragm 60 extends over the portions 62 and 63 of the body member 61 and has its inner periphery suitably secured in position by a plate 64.

A tubular piston rod 68 has its left-hand end, as viewed in Figure 2, threaded into the body 61 and is slidable in bearings 69 and 70. The bearing 69 is provided with a pressure seal 71 to prevent the escape of fluid pressure from the variable pressure chamber 72 of the motor. The piston rod is provided with exhaust openings 74 and is biased to the right in Figure 2 to its normal position by a return spring 75.

A valve operating rod 76 is axially movable in the piston rod 68 and has a bore 77 at its left-hand end (Figure 2) terminating in an exhaust valve seat 78. The bore 77 communicates through radial ports 79 with the space between the rod 76 and piston rod 68.

As will become more apparent below, the valve seat 78 is normally open and accordingly normally communicates with a control chamber 82 in the body 61. This chamber communicates through a passage 83 with the variable pressure chamber 72 of the motor 10 as shown ni Figure 2.

Referring to Figure 3, a valve housing in the form of a plug 86 is threaded into the body 61 and is provided with a jam nut 87. This jam nut may be loosened to thread the plug 86 inwardly or outwardly to relatively adjust the valve mechanism, as will become apparent.

The valve seat plug 90 is threaded in the inner end of the plug 86 and carries at its left-hand end (Figure 3) a resilient valve seat 91 engageable by a valve 92 carried by a valve body 93 mounted in a chamber 94 formed in the plug 86. The chamber 94 communicates through ports 95 with a pressure inlet 96 to which is connected a line 97 (Figure 1) leading to a source of super-atmospheric pressure. The valve 92 is normally closed and is biased to such position by a spring 98.

The valve body 93 is provided with an axially extending stem 100 carrying a head 101 to which is secured an exhaust valve 102 engageable with, but normally disengaged from, the valve seat 78. Such seat is biased away from the valve 102 by a return spring 103. It will be apparent that the control chamber 82 normally communicates with the atmosphere through bore 77 and ports 79 and 74, and that movement of the rod 76 to the left in Figure 3 will close the valve 102 and then open the valve 92 to admit super-atmospheric pressure into the control chamber 82 and thence into the motor chamber 72 to activate the motor.

The master cylinder 38 is secured at one end to the cast body 15, and at its opposite end the master cylinder 38 and the corresponding end of the master cylinder 17 are secured in any suitable manner to the mounting bracket 12. Such bracket may be shaped as shown in Figure 4 and secured at its rear extremity to the fire wall 13. The inner wall of the bracket 12 is provided with suitable openings for the projection therethrough of the push rods 34 and 54 and piston rod 68.

Within the bracket 12, a head 105 is threaded on the piston rod 68 and has a rearward projection 106, the top of which is provided with a shoulder 107 and the bottom of which is provided with a shoulder 108, for a purpose to be described. The projection 106 is mounted between lever arms 110, spaced from each other and constituting a single lever as shown in Figure 4. The rear ends of the push rods 34 and 54 extend between the lever arms 110 and are pivoted thereto as at 111 and 112 respectively.

Between the lever arms 110 is arranged a valve operating and reaction lever 115 mounted on a pivot pin 116 which extends through the lever arms 110. The lever 115 is provided at the top thereof with a finger or tooth 117 engageable with, but normally spaced from, the shoulder 108. At its lower end, the lever 115 is pivotally connected as at 119 to the forward end of a control member in the form of a push rod 120 (Figure 1), pivotally connected in turn as at 121 to a depending brake pedal 122. The lever 115 and rod 120 comprise a control device for operating the valve mechanism as will become apparent below.

A substantially S-shaped lever 125 is pivoted to the lever arms 110 as at 126. This lever has its upper end engaging the adjacent end of the push rod 76 and contacts with two bosses 128 and 129 formed on the lever 115. The lever 125 engages the boss 129 to limit movement of the valve operating rod 76 (Figure 2) to the right under the influence of the valve return spring 103. Rocking movement of the lever 115 clockwise about its pivot 116 causes the boss 128 to operate the lever 125 to transmit movement of the valve mechanism, as further described below.

A substantially inverted J-shaped spring 130 constitutes a reaction retarding spring for the mechanism and has its shorter end 131 engaging the shoulder 107 to bias head 105 to the right. The other end of the spring 130 is extended laterally to bridge across the edges of the lever arms 110 and is secured thereto by screws 118.

Operation

The parts normally occupy the positions shown in Figure 2. When the brakes are to be applied, the operator will depress the brake pedal 122 (Figure 1) to move the control member or push rod 120 to the left, thus transmitting movement to the lower end of the lever 115 (Fig. 2) to rock this lever about its pivot 116 whereby the boss 128 effects turning movement of the lever 125 in a counterclockwise direction about its pivot pin 126. Such operation actuates the valve mechanism to energize the motor, and such operation, described below, takes place within the limits of the gap between the finger 117 and shoulder 108, and accordingly valve operating movement of the rod 76 takes place solely against the loading of the return spring 103 associated with the valve mechanism.

Referring to Figure 3, initial movement of the push rod 76 by the lever 125 moves the seat 78 into engagement with the valve 102, thus disconnecting the control chamber from the atmospheric bore 77. Slight further movement of the push rod 76 unseats the valve 92, thus admitting super-atmospheric pressure from the chamber 94 into the control chamber 82, and thus through passage 83 into the motor chamber 72.

Under such conditions, the pressure responsive unit of the motor will start to move to the left and similar movement will be imparted to the head 105 and through spring 130 to the lever members 110, such members bodily moving to the left without appreciable turning movement.

Such operation of the motor and bodily movement of the levers 110 will move the master cylinder plungers 18 and 39 to the left in Figure 2, fluid being displaced from the master cylinder 19 into the front wheel cylinders 24 and fluid displaced from the master cylinder chamber 40 being supplied to the rear wheel cylinders 45. The lever arms 110 act as an equalizing lever, as will be apparent, assuming altered positions in accordance with pressures in the chambers 19 and 40.

Approximately at the point where the brake shoes initially engage the drums, displacement of fluid from the master cylinders will be resisted, thus tending to retard movement of the master cylinder plungers 18 and 39. Accordingly, at such point continued operation of the pressure responsive unit of the motor will transmit movement to the head 105, such movement taking place to the left in Figure 2 and causing the shoulder 108 to bear against the finger 117. Force thus will be applied to the upper end of the lever 115 to resist turning movement of such lever in a clockwise direction about its pivot 116 by continued operation of the brake pedal. From this point on, therefore, contact between the elements 108 and 117 will transmit reaction forces through the lever 15 and push rod 120 to the brake pedal.

When the brake pedal is released, the return spring 103 will move the valve operating rod 76 to the right in Figures 2 and 3 to open the valve 102, and the return spring 98 will close the valve 92. Accordingly, flow of air under pressure from the chamber 94 to the control chamber 82 will be cut off and air will be exhausted from the latter chamber and from the motor chamber 72 through the bore 77 and ports 79 and 74. The spring 130 will return the tubular piston rod 68 and head 105 to their normal positions relative to the lever arms 110, and the right-hand end of the projection 106 (Figure 2) will engage the adjacent end of the spring 130. The return spring 75, acting through the rod 68 and head 105 will transmit forces to the lever arms 110 to return them to normal positions. The force thus applied to the levers will return the plunger 39 to its normal position, and the return spring 32 in the master cylinder 17 will move the associated plunger 18 to its normal off position.

In the event of a failure of power for the motor, operation of the brake pedal will move the push rod 120 to the left in Figure 2. It will be noted that the yoke on the end of the push rod 120 spans across the lever arms 110 (Figure 4) and the gap between these members is sufficient to provide the necessary turning movement of the lever 115 for a full operation of the valve mechanism. This gap will be closed, however, upon a failure of power for the motor, and direct forces from the push rod 120 will be delivered to the adjacent edge portions of the lever arms 110 in the horizontal plane of the push rod 34, and accordingly pedal forces will be delivered to the plunger 18 to displace fluid from the chamber 19 into the front wheel cylinders. Manual force can be employed to better advantage for applying one set of wheel cylinders than it can be utilized to apply all of the wheel cylinders since less manual force is required due to inherent frictions, resistances to the return springs of the brakes, etc. The motor parts will be moved only a short distance so that losses from pedal applied forces for operating the front wheel brakes are reduced.

In the event of a break in the lines 23 to the front wheel cylinders, depression of the brake pedal will effect operation of the valve mechanism due to inherent resistance to movement of the plunger 18. Accordingly, the motor will be operated and will move the levers 110 until the left-hand edges of the lower portions of the lever arms 110 engage the inner wall of the mounting bracket, whereupon further motor forces will swing the lever arms 110 about the pivot 111 to actuate the master cylinder plunger 39 and thus apply the rear brakes. This operation will provide a reaction through the spring 130 in proportion to the hydraulic pressure in the lines 44.

In view of the foregoing, it will be apparent that the present mechanism employs separate hydraulic fluid systems for the front and rear wheels of a motor vehicle, thus providing a high factor of safety against failure of the brakes and providing for effective manual operation of one set of brakes in the event of a failure of power for the motor. It also will be apparent that a soft initial pedal is provided, as is desirable, and that in later stages of brake operation accurate reaction is transmitted back to the brake pedal in proportion to the forces being applied to the brakes.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster mechanism comprising a pair of spaced parallel devices to be operated, each including a push rod, a lever connected at its ends to said push rods, a fluid pressure motor mounted with its axis between said devices to be operated and having a piston rod, means providing mechanical connection between said piston rod and said lever intermediate its ends, said piston rod being tubular, a valve mechanism for said motor normally balancing pressures therein and operable for connecting said motor to a source of differential pressure to operate it and transmit force through said piston rod to said lever to operate said push rods, a valve operating rod projecting through said piston rod and having one end connected to said valve mechanism to operate it, and a valve operating lever pivotally connected to said first-named lever and having one end engaging the other end of said valve operating rod to move it to operate said valve mechanism.

2. A booster mechanism comprising a pair of spaced parallel devices to be operated, each including a push rod, a lever connected at its ends to said push rods, a fluid pressure motor mounted with its axis between said devices to be operated and having a piston rod, means providing mechanical connection between said piston rod and said lever intermediate its ends, said piston rod being tubular, a valve mechanism for said motor normally balancing pressures therein and operable for connecting said motor to a source of differential pressure to operate it and transmit force through said piston rod to said lever to operate said push rods, a valve operating rod projecting through said piston rod and having one end connected to said valve mechanism to operate it, and a valve operating lever pivotally connected to said first-named lever and having one end engaging the other end of said valve operating rod to move it to operate said valve mechanism, said mechanical connection comprising a manually operable lever pivoted to said first-named lever and having a portion contacting said valve operating lever to turn the latter and effect movement of said valve operating rod upon turning movement of said manually operable lever in one direction.

3. A mechanism according to claim 2 provided with means, comprising a reaction spring, having mechanical connection with said first-named lever and with said manually operable lever for transmitting to the latter reaction forces proportional to forces transmitted to said first-named lever by said piston rod.

4. A mechanism according to claim 2 provided with a member carried by said piston rod, such member and said manually operable lever having normally spaced interengaging portions, and a reaction spring engaging said first-named lever and said member for biasing the interengaging portion of said member to a normal position spaced from the interengaging portion of said manually operable lever.

5. A mechanism according to claim 2 provided with a head carried by said piston rod and projecting longitudinally therefrom, said head having a shoulder facing in the direction of movement of said piston rod when said motor is activated, said head having a finger facing in said direction and said manually operable lever having a finger facing in the opposite direction and normally spaced from said first-named finger, and a spring carried by said first-named lever and engaging said shoulder for biasing said head in said opposite direction.

6. A booster mechanism comprising a pair of spaced parallel devices to be operated, each including a push rod, a lever connected at its ends to said push rods, a fluid pressure rotor mounted with its axis between said devices to be operated and having a piston rod, means providing mechanical connection between said piston rod and said lever intermediate its ends, said piston rod being tubular, a valve mechanism for said motor normally balancing pressures therein and operable for connecting said motor to a source of differential pressure to operate it and transmit force through said piston rod to said lever to operate said push rods, a valve operating rod projecting through said piston rod and having one end connected to said valve mechanism to operate it, a valve operating lever pivotally connected to said first-named lever and having one end engaging the other end of said valve operating rod to move it to operate said valve mechanism, said mechanical connection comprising a manually operable lever pivoted to said first-named lever and having a portion contacting said valve operating lever to turn the latter and effect movement of said valve operating rod upon turning movement of said manually operable lever in one direction, and a manually operable rod pivotally connected to said manually operable lever substantially in axial alinement with one of said push rods, said first-named lever having portions in the path of travel of said manually operable rod and normally spaced therefrom a distance sufficient to provide for turning movement of said manually operable lever to turn said valve operating lever and operate said valve operating rod, said manually operable rod being engageable with said portions of said first-named lever upon a failure of power in said motor to transmit force through said first-named lever to said one push rod.

7. A mechanism according to claim 6 provided with a lost motion connection between said manually operable lever and said piston rod adapted to be closed upon valve operating turning movement of said manually operable lever and upon energization of said motor to transmit reaction forces from said piston rod to said manually operable lever to oppose valve operating turning movement thereof.

8. A mechanism according to claim 6 provided with a head carried by said piston rod and projecting longitudinally therefrom, said head and said manually operable lever having fingers normally spaced from each other when said head and said manually operable lever are in normal off positions, and spring means engaging said first-named lever and said head for biasing the finger of the latter away from the finger of said manually operable lever whereby motor forces will be transmitted through said spring to said first-named lever until said fingers move into engagement with each other, whereupon said head transmits to said manually operable lever forces opposing valve operating turning movement thereof.

9. A mechanism according to claim 8 wherein said spring means has one end connected to said first-named lever, and a return spring engaging said piston rod to bias the latter to a normal off position, said head having its end projecting from said piston rod engaging said end of said spring means to transmit a force to said first-named lever to transmit forces of said return spring through said first-named lever to bias said push rods to normal positions.

10. A booster mechanism comprising a pair of spaced parallel devices to be operated, each including a push rod, a lever connected at its ends to said push rods, a fluid pressure motor mounted with its axis between and parallel to said devices to be operated and having a pressure responsive unit, a tubular piston rod connected at one end to said pressure responsive unit, said motor having a variable pressure chamber, a valve mechanism in said pressure responsive unit normally connecting said variable pressure chamber to a source of low pressure and operable to connect such chamber to a source of high pressure, a valve operating rod projecting through said piston rod and having one end projecting into said pressure responsive unit to operate said valve mechanism, a valve operating lever pivotally connected at one end to said first-named lever and having its other end engaging the other end of said rod, a manually operable lever pivotally connected between its ends to said first-named lever, manual means for applying a force to one end of said manually operable lever to turn it about its pivot, the other end of said manually operable lever having a finger, a head carried by the other end of said piston rod and having a finger normally spaced from said first-named finger, said manually operable lever having a portion engageable with said valve operating lever to effect valve operating turning movement thereof, said fingers being normally spaced apart a distance sufficient to provide for valve-operating turning movement of said manually operable lever, and means biasing said second-named finger to a normal position spaced from said first-named finger.

11. A mechanism according to claim 10 wherein said biasing means comprises a spring fixed at one end to said first-named lever and having its other end engaging said head.

12. A mechanism according to claim 10 wherein said means for applying a force to said manually operable lever comprises a manually operable rod arranged in axial alinement with one of said push rods and spaced from said first-named lever whereby said valve operating lever is free for valve operating turning movement and whereby such space will be taken up upon a failure of power in said motor to transmit force from said manually operable rod through said first-named lever to said one push rod.

13. A mechanism according to claim 10 wherein said biasing means comprises a leaf spring having one end anchored to said first-named lever in the path of travel of said head to be engaged by the latter when said piston rod is in normal off position, the other end of said leaf spring engaging said head to bias said second-named finger away from said first-named finger, and means biasing said piston rod to normal off position.

14. A mechanism according to claim 10 wherein said biasing means comprises a leaf spring having one end anchored to said first-named lever in the path of travel of said head to be engaged by the latter when said piston rod is in normal off position, the other end of said leaf spring engaging said head to bias said second-named finger away from said first-named finger, and means biasing said piston rod to normal off position, said means for applying a force to said manually operable lever comprising a manually operable rod arranged in axial alinement with one of said push rods and normally spaced from said first-named lever to provide for free valve operating turning movement of said valve operating lever, and whereby such space will be taken up upon a failure of power in said motor and said manually operable rod will engage said first-named lever to apply a force therethrough to said one push rod.

15. A booster mechanism comprising a pair of spaced parallel devices to be operated, each including a push rod, a lever connected at its ends to said push rods, a fluid pressure motor having a pressure responsive unit movable on an axis parallel to said devices to be operated, a valve mechanism normally balancing pressures in said motor and operable for connecting said motor to a source of pressure differential to operate said pressure responsive unit, force transmitting means connected between said pressure responsive unit and said lever to transmit force to said lever to operate said devices, means comprising a manually operable control member for operating said valve mechanism, and means for transmitting from said force transmitting means to said control member reaction forces proportional to forces transmitted to said lever.

16. A booster mechanism comprising a pair of spaced parallel devices to be operated, each including a push rod, a lever connected at its ends to said push rods, a fluid pressure motor mounted between said devices and having a pressure responsive unit movable on an axis parallel to said devices, a valve mechanism for said motor normally balancing pressures therein and operable for connecting said motor to a source of differential pressure to operate said pressure responsive unit, force transmitting means connected between said pressure responsive unit and said lever to move it to operate said devices, means for operating said valve mechanism comprising a control device including a manually operable control member, said force transmitting means comprising a spring adapted to be overcome upon the transmission of a given force to said lever, said control device having a portion arranged in the path of travel of a portion of said force transmitting means to be engaged thereby to transmit reaction forces from said force transmitting means to said control member when said spring is overcome.

References Cited in the file of this patent

UNITED STATES PATENTS

| 1,781,868 | Bragg et al. | Nov. 18, 1930 |
| 2,098,666 | La Brie | Nov. 9, 1937 |
| 2,382,866 | Edge et al. | Aug. 14, 1945 |
| 2,791,203 | Ayers | May 7, 1957 |